June 22, 1965     W. W. MOUNT     3,190,484
CUP AND SAUCER
Filed March 22, 1962
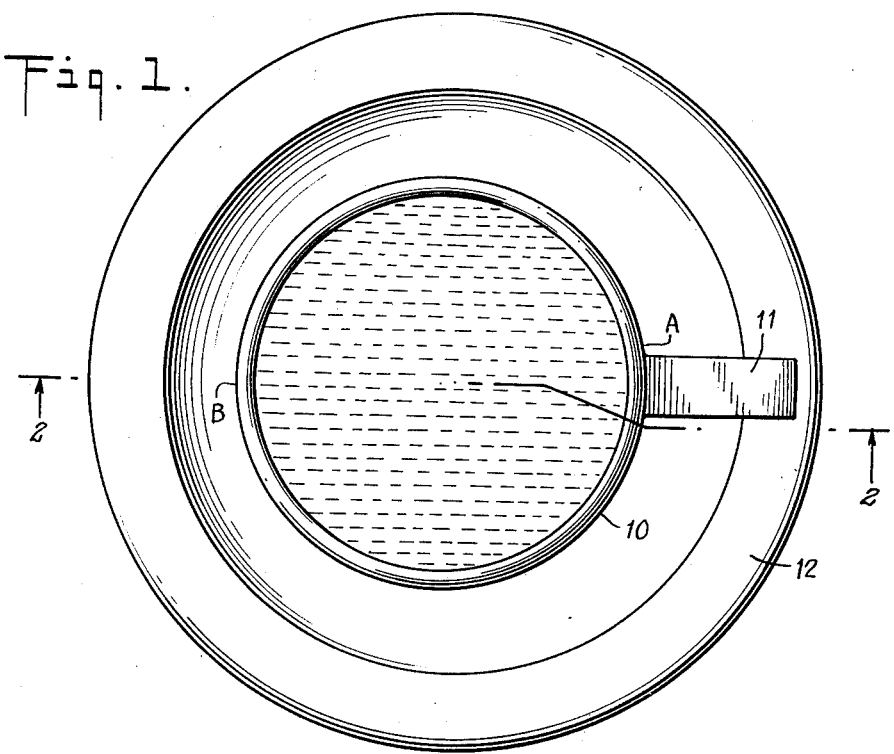
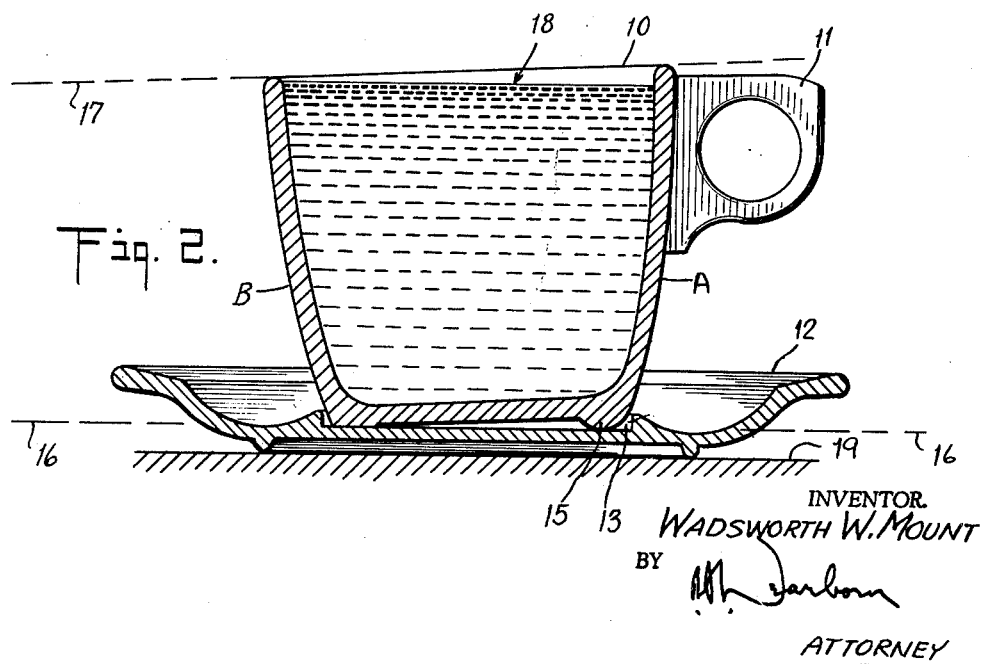
INVENTOR.
WADSWORTH W. MOUNT
BY
ATTORNEY 3,190,484
CUP AND SAUCER
Wadsworth W. Mount, Warren Township, Somerset County, N.J. (Mountain Ave., Plainfield, N.J.)
Filed Mar. 22, 1962, Ser. No. 181,551
1 Claim. (Cl. 220—23.83)

This invention pertains to cups and saucers and has for its object to provide a cup with a single handle near the brim which is simple, easy to produce, and does not differ in general appearance from ordinary cups in common use, but nevertheless embodies effective means for preventing the coffee or other liquid contained therein from slopping onto the handle of the cup.

It is annoying to anyone being served with a cup of coffee or other liquid to have the handle wet because some of the coffee has slopped over as it is being placed on the table.

If the cup is filled near to the brim, the guest may add cream, or for some other reason some of the coffee is usually slopped over, and thus the handle is wet and uncomfortable.

The cup of this invention has no projections, lips or unsightly additions, and can be easily stacked by nesting with other cups of the same kind, or with ordinary cups.

Referring to the drawings:

FIG. 1 is a plan view of a cup and saucer embodying this invention; and

FIG. 2 is a sectional elevation on the line 2—2 of FIG. 1.

The cup 10 has a single handle 11 near the brim, and the lip of the cup is smooth, has no projections or additions, and is in all respects like well known cups in general use.

The saucer 12 is of the usual design and is shown only to illustrate the cup which embodies this invention. It has a centrally located circular recess 13 to receive the bottom of the cup.

The cup has an annular bead 15 at the bottom which differs from the usual form in that it projects from the cup bottom to a greater distance at the side where the single handle 11 is located close to the brim and projects to a lesser extent at the side of the cup opposite the handle. Whether the cup is made with or without the customary annular bead on its bottom, the cup will be made with a single handle near the brim and will be so made that its vertical height above a horizontal surface on which it rests will be greater on handle side A than on side B.

The bead 15 has a gradual change of height and constitutes a circular support in a plane, which is at a small angle from that of the top of the cup, as indicated by the broken lines 16 in the bottom plane and 17 in the top plane.

When the saucer 12 is resting on a horizontal table top 19, or the like, in the position shown in FIG. 2, and the cup is placed thereon with the bottom bead 15 set into the circular recess 13, then if substantially filled with liquid such as coffee or tea, the top level of the liquid shown at 18 is parallel to the table top 19, but the top edge 10 of the cup is higher at the side where the single handle is located near the brim so that the liquid is closer to the top edge of the cup opposite the handle.

If there is any slopping of the liquid during serving or while in use, it will overflow at the edge opposite the single handle, which is thus protected and will tend to remain dry and suitable for use.

While I have shown and described the best embodiment now known to me, it should be understood that the cup alone may be used, as in counter restaurants, without any saucer, with the same advantages.

Other forms of cups or mugs may be used, provided the bottom plane is at a small angle to the top plane of the cup or mug, with a single handle on the high side.

Attention is especially directed to the fact that the cup corresponds to standard, well known cup patterns and has no projections or deformations so that it may be stacked by nesting as usual with other similar cups or with standard cups. The usual pleasing appearance of the cup is retained, and it may be manufactured by regular methods because of its simplicity.

Only such limitations should be imposed as are indicated in the appended claim.

I claim:

A cup having a top rim in a plane perpendicular to the center line of the cup, a bottom downwardly spaced from said top rim and in a plane at a slightly inclined angle to a second plane parallel to the top plane, whereby the cup is slightly higher on one side than on the opposite side, and a single handle at the rim on the high side of the cup whereby the cup is adapted to nest with like cups and with cups of standard shape.

References Cited by the Examiner

UNITED STATES PATENTS

| | | | |
|---|---|---|---|
| D. 144,905 | 6/46 | Cameron | D144—9 |
| 2,994,320 | 8/61 | Poschadel | 220—70 |

FOREIGN PATENTS 9,590 of 1886 Great Britain.
13,956 of 1891 Great Britain.

THERON E. CONDON, *Primary Examiner.*

EARLE J. DRUMMOND, *Examiner.*